United States Patent
Tauheed et al.

(10) Patent No.: US 12,014,286 B2
(45) Date of Patent: Jun. 18, 2024

(54) ENABLING EFFICIENT MACHINE LEARNING MODEL INFERENCE USING ADAPTIVE SAMPLING FOR AUTONOMOUS DATABASE SERVICES

(71) Applicant: Oracle International Corporation, Redwood Shores, CA (US)

(72) Inventors: Farhan Tauheed, Zurich (CH); Onur Kocberber, Baden-Daettwil (CH); Tomas Karnagel, Zurich (CH); Nipun Agarwal, Saratoga, CA (US)

(73) Assignee: Oracle International Corporation, Redwood Shores, CA (US)

( * ) Notice: Subject to any disclaimer, the term of this patent is extended or adjusted under 35 U.S.C. 154(b) by 154 days.

(21) Appl. No.: 16/914,816

(22) Filed: Jun. 29, 2020

(65) Prior Publication Data
US 2021/0406717 A1    Dec. 30, 2021

(51) Int. Cl.
G06N 5/04 (2023.01)
G06F 16/22 (2019.01)
G06N 20/00 (2019.01)

(52) U.S. Cl.
CPC ........... *G06N 5/04* (2013.01); *G06F 16/2282* (2019.01); *G06N 20/00* (2019.01)

(58) Field of Classification Search
CPC ....... G06N 5/04; G06N 20/00; G06F 16/2282
See application file for complete search history.

(56) References Cited

U.S. PATENT DOCUMENTS

| | | | |
|---|---|---|---|
| 5,819,255 A | 10/1998 | Celis | |
| 6,278,989 B1 | 8/2001 | Chaudhuri et al. | |
| 6,434,545 B1 | 8/2002 | MacLeod | |
| 7,213,012 B2 | 5/2007 | Jakobsson | |
| 7,849,032 B1 | 12/2010 | Campos et al. | |
| 9,798,772 B2 | 10/2017 | Wu et al. | |
| 10,073,885 B2 | 9/2018 | Das et al. | |
| 2005/0125452 A1 | 6/2005 | Ziauddin | |
| 2005/0283458 A1 | 12/2005 | Galindo-Legaria | |

(Continued)

OTHER PUBLICATIONS

Su, U.S. Appl. No. 15/666,380, filed Aug. 1, 2017, Office Action, Sep. 23, 2019.

(Continued)

*Primary Examiner* — Rasha S Al Aubaidi
(74) *Attorney, Agent, or Firm* — Hickman Becker Bingham Ledesma LLP; Brian Miller

(57) ABSTRACT

Herein are approaches for self-optimization of a database management system (DBMS) such as in real time. Adaptive just-in-time sampling techniques herein estimate database content statistics that a machine learning (ML) model may use to predict configuration settings that conserve computer resources such as execution time and storage space. In an embodiment, a computer repeatedly samples database content until a dynamic convergence criterion is satisfied. In each iteration of a series of sampling iterations, a subset of rows of a database table are sampled, and estimates of content statistics of the database table are adjusted based on the sampled subset of rows. Immediately or eventually after detecting dynamic convergence, a machine learning (ML) model predicts, based on the content statistic estimates, an optimal value for a configuration setting of the DBMS.

20 Claims, 5 Drawing Sheets

(56) References Cited

U.S. PATENT DOCUMENTS

| | | | |
|---|---|---|---|
| 2010/0235347 | A1 | 9/2010 | Chaudhuri |
| 2011/0022581 | A1 | 1/2011 | Korlapati |
| 2014/0095475 | A1 | 4/2014 | Su et al. |
| 2015/0347512 | A1 | 12/2015 | Luo |
| 2017/0031967 | A1 | 2/2017 | Chavan et al. |
| 2017/0068675 | A1 | 3/2017 | Hazel |
| 2018/0107711 | A1 | 4/2018 | Tariq |
| 2020/0125545 | A1 | 4/2020 | Idicula |
| 2020/0134070 | A1* | 4/2020 | Sidoti .................. G06F 16/23 |
| 2020/0342265 | A1* | 10/2020 | Cai ..................... G06N 20/00 |
| 2021/0342353 | A1* | 11/2021 | Jagota .............. G06F 16/24558 |

OTHER PUBLICATIONS

Su, U.S. Appl. No. 15/666,380, filed Aug. 1, 2017, Final Office Action, Feb. 5, 2020.

Chavan, U.S. Appl. No. 15/146,798, filed May 4, 2016, Office Action, Oct. 19, 2018.

Chavan, U.S. Appl. No. 15/146,798, filed May 4, 2016, Notice of Allowance, Mar. 27, 2019.

Chavan, U.S. Appl. No. 15/146,798, filed May 4, 2016, Interview Summary, Jan. 24, 2019.

PostgreSQL 9.0, "Analyze", https://www.postgresql.org/docs/9.0/sql-analyze.html, last viewed on Jun. 29, 2020, 2 pages.

Oracle8i interMedia Text Reference Release 2 (8.1.6), "Optimizing Queries with Statistics", https://docs.oracle.com/cd/A87860_01/doc/inter.817/a77063/aoptim2, last viewed on Jun. 29, 2020, 3 pages.

Oracle® Database Performance Tuning Guide, "13 Managing Optimizer Statistics", https://docs.oracle.com/cd/E25054_01/server.1111/e16638/stats, last viewed on Jun. 29, 2020, 30 pages.

Oracle, "Database Performance Tuning Guide", 13 Managing Optimizer Statistics, https://docs.oracle.com/cd/B28359_01/server.111/b28274/stats.htm#PFGRF003, last viewed on Jun. 29, 2020, 27 pages.

Oracle Help Center, "Database Performance Tuning Guide", Oracle Database Online Documentation Release 1 (11.1), https://docs.oracle.com/cd/B28359_01/server.111/b28274/stats.htm, dated Jun. 29, 2020, 2 pgs.

MYSQL, "8.3.7 InnoDB and MyISAM Index Statistics Collection", https://dev.mysql.com/doc/refman/5.7/en/index-statistics, last viewed on Jun. 29, 2020, 3 pages.

My SQL, "14.8.11.1 Configuring Persistent Optimizer Statistics Parameters", ;https://dev.mysql.com/doc/refman/5.6/en/innodb-persistent-stats.html, last viewed on Jun. 29, 2020, 11 pages.

My SQL, "13.7.2.1 Analyze Table Statement", https://dev.mysql.com/doc/refman/5.6/en/analyze-table.html, last viewed on Jun. 29, 2020, 3 pages.

Microsoft, "Update Statistics", https://docs.microsoft.com/en-us/sql/t-sql/statements/update-statistics-transact-sql?view=sql-server-ver15, last viewed on Jun. 29, 2020, 10 pages.

Lance Ashdown et al., "Oracle? Database SQL Tuing Guide 12c Release 1 (12.1)", Data Engineering, dated 2009, IEEE, 566 pages.

Kabra et al., "Efficient Mid-Query Re-Optimization of Sub-Optimal Query Execution Plans", AMC, dated 1998, 12 pages.

IBM MQ, "Analyze Command", IBM Insights, www.ibm.com/support/knowledgecenter/SSPT3X_4.2.0/com.ibm.swg.im.infosphere.biginsights.commsql.doc/doc/bsql_analyze, last viewed on Jun. 29, 2020, 9 pgs.

IBM Community Home, "Where am I", https://community.ibm.com/community/user/legacy?lang=en, last viewed on Jun. 29, 2020, 4 pages.

Heule et al., "HyperLogLog in Practice: Algorithmic Engineering of a State of The Cardinality Estimation Algorithm", EDBT/ICDT '13 Mar. 18-22, 2013, Genoa, Italy, 10 pages.

Flajolet et al., "HyperLogLog: the analysis of a near-optimal cardinality estimation algorithm", dated 2007 Discrete Mathematics and Theoretical Computer Science (DMTCS), 21 pages.

Kim et al., "Dynamic Statistics Collection in the Teradata Unified Data Architecture", IEEE 33rd International Conference on Data Engineering, dated Apr. 2017, 4 pages.

Venkateswarlu at al., "Investigate the Impact of Dataset Size on the Performance of Data Mining Algorithms", International Journal of Innovative Research in Engineering & Management, vol. 3, No. 2, dated Mar. 2016, 8 pages.

Rojas et al., "Sampling Techniques to Improve Big Data Exploration", IEEE 7th Symposium on Large Data Analysis and Visualization, dated 2017, 10 pages.

Petrak et al., "On the Use of Fast Subsampling Estimates for Algotithm Recommendation", dated Nov. 1, 2020, 10 pages.

G.H John et al., "Static Versus Dynamic Sampling for Data Mining" KDD-96 Proceedings, dated Dec. 31, 1996, 4 pages.

Francois Portet et al., "Reduction of Lage Traning Set by Guided Progressive Sampling: Application to Neonatal Intensive Care Data", dated Jan. 1, 2001, 2 pages.

Foster Provost et al., "Efficient Progressive Sampling", Proceedings/KDD-99, The fifth ACM Sigkdd International Conference on Knowledge Discovery and Data Mining, dated Aug. 1, 1999, pp. 23-32.

Figueroa et al., "Predicting Sample Size Required for Classification Performace", BMC Medical Informatics and Decision Making, Biomed Central, vol. 12 No. 1, dated Feb. 15, 2012, 10 pages.

Bishop et al., "Adaptive Sampling with the Ensemble Transform Kalman Filter. Part I: Theoretical Aspects", Monthly Weather Review, vol. 129, Iss. 3, dated Mar. 2001, 17 pages.

Van Aken et al., "Automatic Database Management System Tuning Through Large-scale Machine Learning," Proceedings of the 2017 ACM International Conference on Management of Data, 2017, pp. 1009-1024.

Narayanan et al., "Continuous resource monitoring for self-predicting DBMS", IEEE International Symposium on Modeling, Analysis and Simulation of Computer and Telecommunication Systems, 2005, 10 pages.

Ganapathi, A. et al. "Predicting multiple performance metrics for queries: Better decisions enabled by machine learning", ICDE 2009, 12 pages.

Duan et al., "Tuning Database Configuration Parameters with iTuned", VLDB dated 2009, 12 pages.

\* cited by examiner

ENABLING EFFICIENT MACHINE LEARNING MODEL INFERENCE USING ADAPTIVE SAMPLING FOR AUTONOMOUS DATABASE SERVICES

FIELD OF THE INVENTION

The present invention relates to self-optimization of a database management system (DBMS) such as in real time. Herein are adaptive just-in-time sampling techniques for estimating database content statistics that a machine learning (ML) model may use to predict configuration settings that conserve computer resources such as execution time and storage space.

BACKGROUND

Tuning automation for database services may rely on user data statistics. Collecting data statistics on a production system is costly and can consume valuable computer resources. Existing database engines use dedicated statistics gathering modules to collect and continuously maintain data statistics, which can decrease system throughput. These modules are limited because the statistics are not always available when needed and thus tuning automation sometimes should not expect to use these modules. For example, the collection may be turned off to minimize overhead during high server load. Another example can be the case of analytical pushdown engines. In this case the statistics collection is delayed until the data is offloaded into the analytical engine to boost efficiency. The unavailability of statistics before the offload creates a problem for automating pre-offload decisions such as determining the number of computers and/or database instances in an analytical cluster, optimum data format, data compression, and data layout.

To address these issues, some database systems facilitate statistics collection on demand, such as during histogram creation. This can ensure that data statistics are always available, however there are two issues:
  On demand statistics collection can be significantly time consuming, as can database tuning analysis of collected statistics; and
  The type of statistics collected on demand are hard-coded (typically used for query optimization). Customizing statistics is difficult and unsuitable if the tuning automation evolves over time and/or the dependency on the quality and type of statistics changes.

An alternative solution is to use sampling provided by existing structured query language (SQL) database systems to manually collect statistics needed before database tuning. This can speed up tuning analysis time and facilitate tuning automation to customize the statistics needed. However, this approach still has limitations:
  The performance is still a bottleneck because sampling is a function of the table size. Even a 1% sample size of a large table used in an analytical workload can be costly.
  The feature requires knowing the sample size (usually in percentage of the table size). Knowing the optimum sample percentage a-priori is difficult, and there is no way to know if the quality of the statistics will be sufficient before starting collection.
  Over-sampling can cause performance bottlenecks, while under-sampling can cause inaccuracies in model inference, especially in the case when the sample scan returns empty or nearly empty results for small tables or very small sample percentages.

Therefore, existing approaches are unsuitable for on-demand statistic collection from a large dataset such as for feature extraction such as for machine learning (ML) model inference such as presented herein.

DETAILED DESCRIPTION

Figure 1:
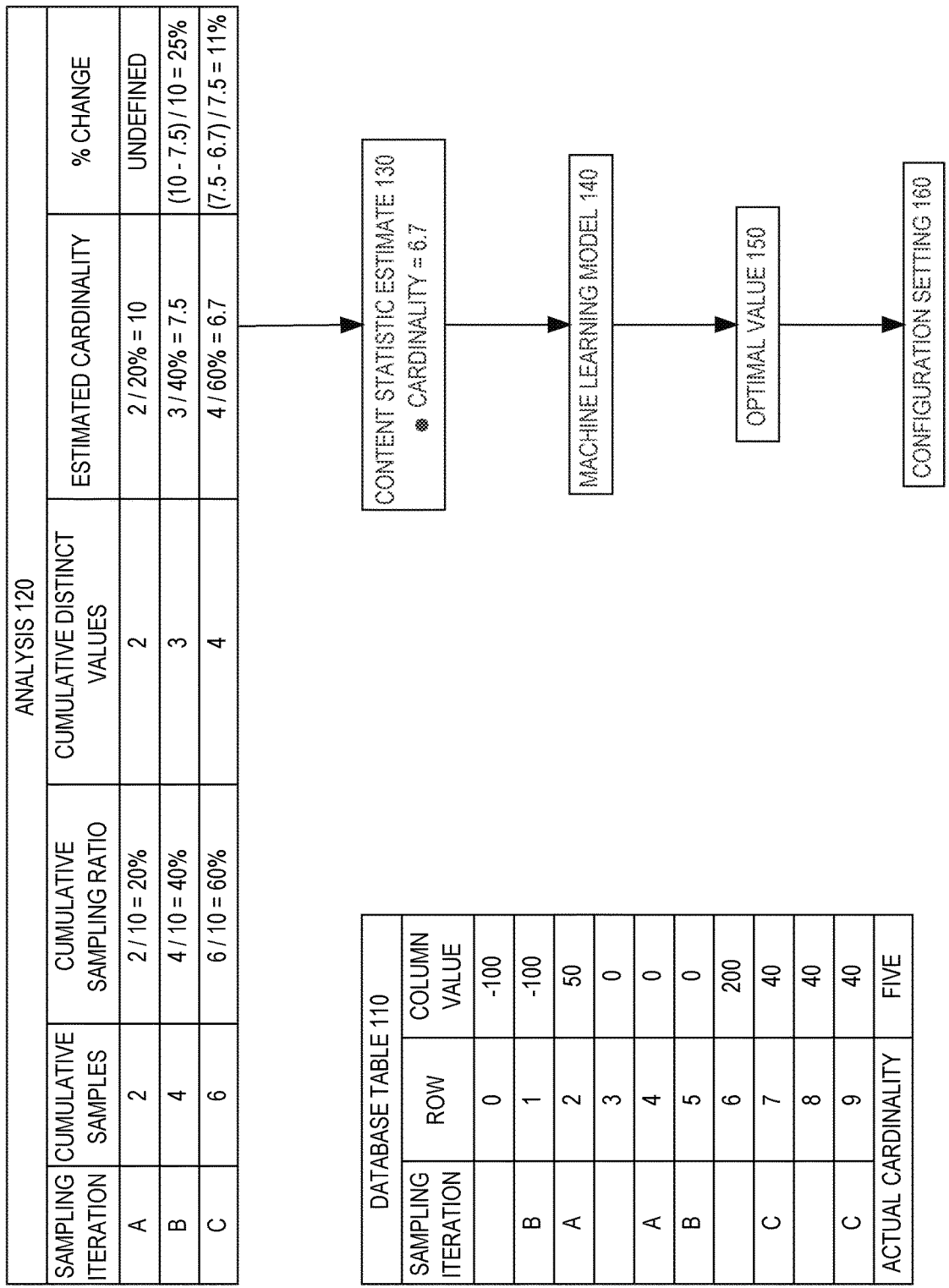
FIG. 1 is a block diagram that depicts an example database management system (DBMS) that uses machine learning (ML) and minimal data sampling to self-optimize for conservation of computer resources such as execution time, volatile memory, and/or persistent storage.

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

General Overview

Autonomous database services herein can significantly reduce operation costs by offloading burdensome tasks from database administrators. Time consuming operations such as database tuning, updating, and patching can be automated to also reduce human error. Autonomous services herein rely on trained machine learning (ML) models that can optimize workload performance, improve availability, or reduce the service cost. ML models herein make decisions in a production system in real-time. Low-latency tuning automation may be important for an interactive user experience and also to avoid undue impact on system throughput. One aspect of real-time tuning analysis is that it relies on extracting data-oriented features from the user content that can become time-consuming. Using static (pre-computed) metadata is not sufficient to make accurate tuning predictions and thus it is necessary to collect data statistics on-demand efficiently. Existing approaches for collecting statistics make such analysis slow due to an input/output (I/O) bottleneck, and the problem becomes worse as the data size grows.

Approaches herein are based on adaptive sampling that minimizes statistics collection overhead without sacrificing ML model accuracy. Techniques herein are generally applicable to a database management system (DBMS) and facilitate rapid customization, as ML models evolve in a production system, of statistics types and desired accuracy.

The statistics collection approaches herein are designed especially for ML models. That facilitates efficient ML model inference using an adaptive sampling algorithm. That also facilitates rapid recalibration of the statistics required as ML models evolve over time as follows:

- Adaptive sampling for ML inference: This approach uses an iterative sample algorithm to collect statistics by establishing a feedback loop with ML model inference that consumes the statistic. This feedback loop facilitates the collection process to continue adaptively until the convergence criteria is reached, in which case the collection process terminates. This improves the collection efficiency, where over-sampling can become costly. It also improves the statistics quality because the collection process is guided by the consumer feedback loop itself so that the under-sampling issue is also addressed.
- Rapid recalibration: As ML models evolve in the production system, the types and quality requirements for needed statistics may change. Approaches herein provide interfaces to easily re-adjust the type and quality requirements. First, statistic computation and convergence criteria are exposed as user defined interfaces. That facilitates customization without making costly changes to the core source code of the database engine. Second, the process of finding optimum statistics-collection configuration parameters is automated. For example, sample size increments and statistics delta thresholds are determined during an offline model training phase that reuses the same iterative sampling algorithm.
- Improved efficiency of autonomous services: Statistics can be gathered more efficiently because over-sampling issues are prevented. The process of statistics collection stops as soon as the quality of the statistics is satisfactory and thus avoids unnecessary I/O overhead.
- Minimize end-to-end time for development and deployment: Sampling approaches herein are oriented towards serving ML models. As ML models age and continuously evolve, the cost for changing the criteria for collecting statistics becomes minimal. No core source code changes in the database engine are required. Only the user defined interfaces need to be adjusted as models are updated.

Statistics collection specially designed for machine learning is novel, as are the above aspects for rapid recalibration of statistics collection. These technological improvements may be readily incorporated into best of breed DBMS products such as a relational DBMS (RDBMS).

In an embodiment, a computer repeatedly samples database content until a dynamic convergence criterion is satisfied. In each iteration of a series of sampling iterations, a subset of rows of a database table are sampled, and estimates of content statistics of the database table are adjusted based on the sampled subset of rows. Immediately or eventually after detecting dynamic convergence, a machine learning (ML) model predicts, based on the content statistic estimates, an optimal value for a configuration setting of the DBMS.

1.0 Example Database Management System

FIG. 1 is a block diagram that depicts an example database management system (DBMS) 100, in an embodiment. DBMS 100 uses machine learning (ML) and minimal data sampling to self-optimize for conservation of computer resources such as execution time, volatile memory, and/or persistent storage.

DBMS 100 may be hosted by one or more computers such as: rack servers such as blades, personal computers, mainframes, virtual computers, or other computing devices. When computer 100 has multiple computers, the computers are interconnected by a communication network. DBMS 100 may contain databases that contain tables, such as 110, such as a relational table or a column family.

Database table 110 may reside in volatile and/or nonvolatile storage. Database table 110 may have many rows 0-9 and columns, and each column may store as many values as database table 110 has rows. Database table 110 has an example column that contains example integer values such as −100 and 40 as shown. For example, the value stored in the example column of row 6 is 200 as shown.

DBMS 100 may collect various static and dynamic statistics about database table 110 such as row count, count of columns in a compound key, and value distributions. In an embodiment, content may be dynamically added, removed, or modified such as according to a data manipulation language (DML) statement. Such content manipulation may cause dynamic statistics of database table 110 to fluctuate, which may invalidate some or all previously collected statistics. For example, deleting row 6 would cause the arithmetic mean value of the example column to decrease.

In various embodiments, database table 110 has a fixed or evolving schema that may or may not be altered such as according to data definition language (DDL) statements that may add or redefine columns, constraints, and indices. Such schematic alteration, although seemingly static, may cause dynamic statistics of database table 110 to fluctuate. For example in various embodiments, dynamic statistics may be fluctuate by: a) redefining the example column to store only unsigned integers, or b) creating a unique index on the example column.

In any case, performance characteristics of DBMS 100 may depend on dynamic statistics of database table 110. For example when database table 110 has few rows, fully loading database table 110 into volatile memory would not cause virtual memory to thrash. Whereas when database table 110 has billions of rows, fully loading database table 110 into volatile memory could cause excessive thrashing of virtual memory, which may incur latency such as I/O (input/output) waiting (IOWAIT) such as due to rotational latency or track seeking by a mechanical disk. Thus, DBMS 100 may self-optimize performance by configuring itself and its operations in ways that may depend on dynamic statistics of database table 110.

In the shown example, cardinality of the example column is an important dynamic statistic of database table 110. Cardinality of a column is a count of distinct values in the column such as according to a metric such as number of distinct values (NDV). DBMS 100 may use such column cardinality to configure a histogram, hash table, or index such as for grouping, sorting, or joining of data. For example, configuring a hash table with more buckets/bins may reduce hash collisions (i.e. time) but increase memory demand (i.e. space). Thus, hash table configuration may entail a performance tradeoff between time and space. Finding on optimal amount of bins may depend on the cardinality of the example column.

The actual cardinality of the example column is five as shown, which means that the example column contains five distinct values, with the remaining values in the example column being duplicates of those five distinct values. The actual cardinality may be precisely measured by a scan of an index or, if no index is available, by a table scan that inspects, for all table rows 0-9, all of the values, including duplicates, stored in the example column. A table scan is slow due to I/O and may cause thrashing of: a) virtual memory, or b) a database cache such as a row cache or a data block cache. Besides cardinality, other dynamic statistics may entail a table scanning such as for other value statistics of the example column such as minimum, maximum, arithmetic mean, statistical mode, variance, standard deviation, and entropy. For example, such value statistics may reveal data skew that may degrade performance of a sub-optimally configured hash table such as by inducing: bias of a hash function, or imbalance of a multilevel hash tree.

DBMS 100 avoids a table scan for any of those dynamic statistics by instead: a) sampling only a subset of available values, and b) estimating dynamic statistic(s) from the sampled values. For example, sampling one percent of available values may, if speedup is unitary, cause 100× speedup compared to table scanning. Although a smaller sample size accelerates statistic estimation more, the smaller is the sample size, the less accurate is the estimate of the statistic.

Thus, sample sizing entails a tradeoff between faster estimation and, due to inaccuracy, suboptimal database configuration that may slow DBMS 100 and/or increase memory consumption. For example when a database table has billions of rows, a sample size of a tenth or hundredth of a percent may provide sufficient accuracy to nearly optimally configure DBMS 100. Whereas, sampling ten percent of the values shown in the example column provides an estimated cardinality of one, which is inaccurate by a factor of five, which in some scenarios could impose significant performance degradation on DBMS 100 by causing misconfiguration.

Thus sample size, as a percentage of available data or as an amount of values, should not be fixed. Sample size should depend on the value distribution in the available data such as in the example column. A technical dilemma arises when: a) sampling is used to avoid table scanning, b) sample size depends on value distribution, and c) detecting value distribution needs table scanning that should be avoided. Approaches herein overcome this technical problem by incrementally increasing a sample size until statistical convergence is dynamically detected based on content statistic estimate 130, machine learning model 140, optimal value 150, configuration setting 160, and sampling iterations A-C that cooperate as follows.

2.0 Example Self-Optimization Process

Figure 2:
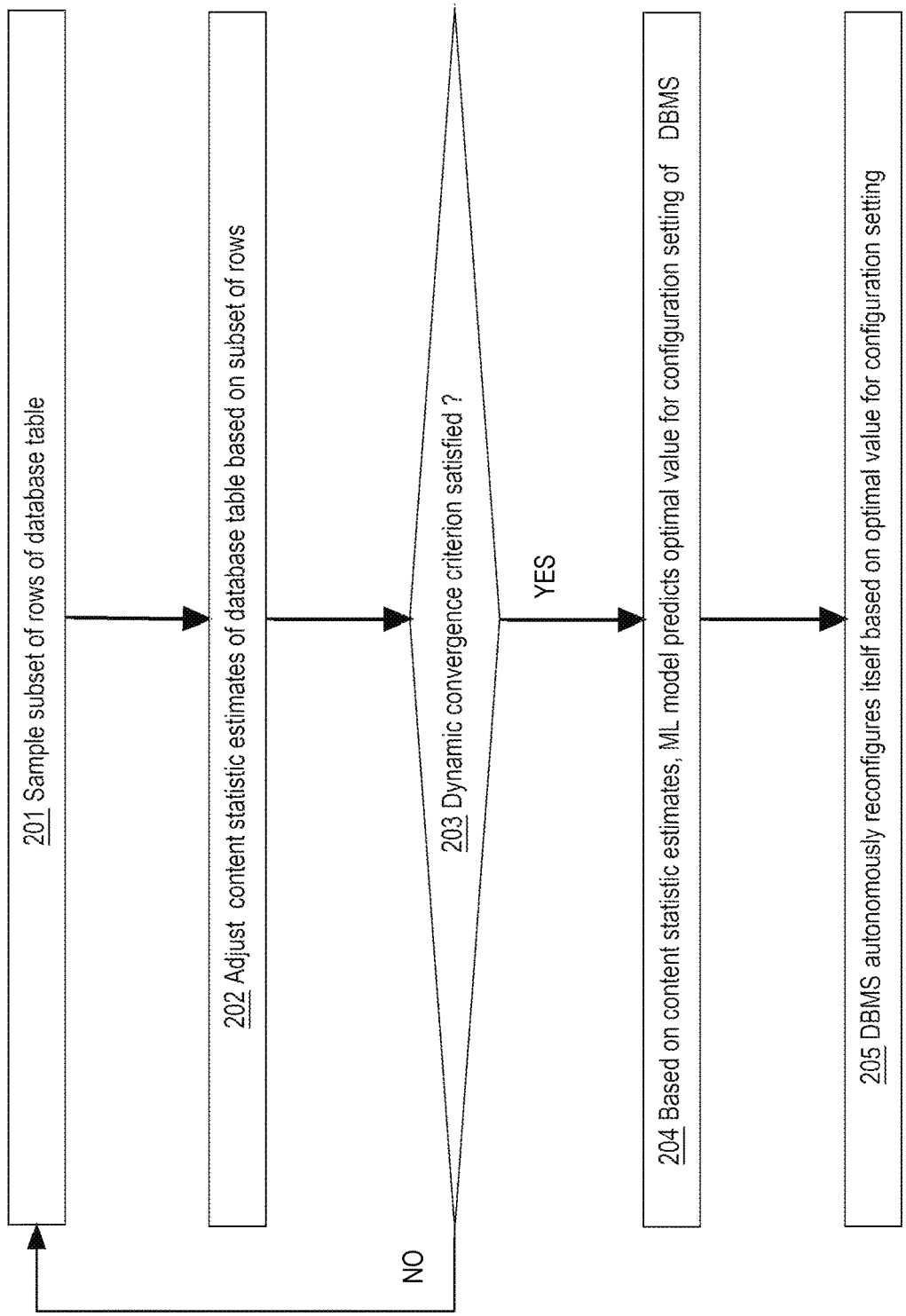
FIG. 2 is a flow diagram that depicts an example self-optimization process that a DBMS may perform to autonomously reconfigure to conserve computer resources such as time and space.

FIG. 2 is a flow diagram that depicts an example self-optimization process that DBMS 100 may perform to autonomously reconfigure to conserve computer resources such as time and space as discussed above. FIG. 2 is discussed with reference to FIG. 1.

The process of FIG. 2 occurs in two phases. Steps 201-203 repeatedly occur during iterations A-C of a sampling phase. Steps 204-205 occur during a tuning phase that immediately or eventually follows the sampling phase. Step 203 detects when the sampling phase should cease.

Steps 201-202 may be repeated in each iteration of a sequence of sampling iterations such as A-C. Various causes in various embodiments or scenarios may initiate the sequence of iterations. Example initiation causes include: DML statement preparation such as of an open database connectivity (ODBC) prepared statement, initiation or completion of query planning, and autonomy of DBMS 100 such as: fluctuating workload such as a demand spike or idleness or thrashing, scheduled such as by timer, phasic such as for archiving or reporting or extract/translate/load (ETL), availability of resources such as disk space or volatile memory, schematic such as table truncation or index creation, or a database trigger.

Step 201 samples a subset of rows 0-9 of database table 110. In each of sampling iterations A-C, step 201 increases the cumulative sample size by some amount that, in various embodiments, is fixed such as shown or dynamically adjusted. As shown in each iteration, two more samples are added to the cumulative samples that grows to four in iteration B and six in iteration C.

Once added to the cumulative samples, a sample remains in the cumulative samples for all subsequent iterations. To the cumulative samples, each iteration adds a disjoint set of samples. For example, row 4 that is sampled in iteration A will not be sampled in subsequent iterations, even though row 4 remains in the cumulative samples for all subsequent iterations B-C. However, different sampled rows of same or different iterations may coincidentally have duplicate values. For example, both samples in iteration C coincidentally have a same value.

Rows 7 and 9 are not sampled until iteration C, which causes the cumulative samples to include rows 1-2, 4-5, 7, and 9. Some rows are never sampled such as rows 3, 6, and 8. Usually most or nearly all rows are not sampled during a sequence of iterations, especially if a database table has many rows.

In this example, sampling a row entails sampling the value stored in the example column of the row. A single sample in other examples may include values of multiple columns of: a same row or a same snowflake instance such as a multidimensional star returned during online analytical processing (OLAP). For example, a single sample may entail several structured query language (SQL) operators, expressions, and/or user defined functions (UDF). Due to expression processing, different values stored in different rows of a same table column may yield a same sample value. For example, two different timestamps representing different respective days may yield a same sampled month.

Step 202 adjusts content statistic estimates of database table 110 based on: the samples of the subset of rows of the current sampling iteration, and/or the cumulative samples. For example, a minimum value in the example column may be a content statistic that may be estimated as zero in iteration A. The estimated minimum would be decreased to −100 in iteration B and unchanged in iteration C. In an embodiment, the estimated minimum may be scaled such as inversely proportional to the sampling ratio. For example, the estimated minimum may be doubled when half of the available data is included in the cumulative samples.

As shown, cardinality of the example column may be a content statistic. As sampled, there are 2-4 cumulative distinct values in respective iterations A-C. As shown, estimated cardinality may be inversely scaled according to the cumulative sampling ratio such that estimated cardinality, as adjusted by step 202, may be 10, 7.5, and 6.7 in respective iterations A-C. As shown, the actual cardinality is five. Thus based on increasing cumulative sample size, repeated adjustment by step 202 increases the accuracy of the estimated cardinality.

However, the increase in accuracy may diminish with each iteration. As shown, iteration B revises the estimated cardinality by 25%, but iteration C revises by only 11%. Thus, repeated estimation of a content statistic converges more or less monotonically toward the actual statistic.

A rate of progress toward the actual statistic usually diminishes in subsequent iterations. Thus, the statistical significance of early iterations is increased and of later iterations is reduced. Thus, later iterations are less important than earlier iterations and may be avoided to save time and electricity without unduly degrading accuracy.

At the end of each iteration may be step 203 that detects whether or not one or more dynamic convergence criteria are satisfied. In various embodiments, if one or all convergence criteria are satisfied, then iteration ceases and step 204 may immediately or eventually occur. If step 203 does not detect dynamic convergence, then iteration continues by repeating steps 201-202 in a next iteration.

Various embodiments may have various dynamic convergence thresholds such as: maximum iterations, maximum time, maximum cumulative sample size, maximum cumulative sampling ratio, and minimum percent or absolute change of the content statistic estimate. As shown, step 203 may cease iterating by detecting that: three iterations occurred, more than 900 milliseconds were spent iterating, more than half of available data was cumulatively sampled, and/or estimated cardinality changed less than 15% in iteration C. An embodiment may extend iteration beyond a convergence threshold such as percent estimate change such as to achieve at least a minimum amount of: iterations, time, cumulative sample size, and/or cumulative sampling ratio. In various embodiments or examples, a respective UDF may calculate one of: sample size for one or all iterations, cumulative distinct values or other sampling-based fact, an estimated statistic such as estimated cardinality, a percent or absolute change in an estimate between iterations, and convergence detection.

Content statistic estimate 130 is: a) the estimated cardinality of the example column, b) the result of the sampling phase, and c) calculated by last iteration C in step 202. Based on content statistic estimate 130, machine learning (ML) model 140 predicts optimal value 150 for configuration setting 160 of DBMS 100 in step 204. For example, configuration setting 160 may be a hash value width in bits or bytes, with a wider hash value being perhaps counterintuitively faster by minimizing hash collisions, and a narrower hash value perhaps counterintuitively causing a hash table to consume more memory. Thus, configuration setting 160 may entail a tradeoff between time and space, with optimal value 150 being a predicted so-called sweet spot that may depend on dynamic conditions such as content statistic estimate 130.

Calculating optimal value 150 may entail mathematical optimization, which is the purpose of ML model 140. ML model 140 can predict/infer optimal value 150 from numeric and/or symbolic inputs, including content statistic estimates such as 130. In various examples, ML model 140 may be a random forest, a linear or logistic regressor, an artificial neural network (ANN), or a support vector machine (SVM). In this example, ML model 140 is already trained such as by reinforcement learning such as with a corpus of training data such as by gradient descent and/or as discussed later herein. Depending on the nature of configuration setting 160, optimal value 150 may be numeric or categorical/symbolic. For example, optimal value 150 may be a Boolean such as a configuration toggle or a categorical value such as a selection of one of enumerated kinds of hash tables or one of enumerated hash functions.

In step 205, DBMS 100 autonomously reconfigures itself by assigning optimal value 150 to configuration setting 160. In another example, step 205 may assign respective optimal values to multiple configuration settings such as a hash value width, a hash bin count, and a hash function such as needed to formulate, configure, and/or execute a query plan. The multiple configuration settings may have respective optimal values predicted by same or different ML models of same or different kinds of models. For example, the hash value width and hash bin count may be predicted by a same linear regressor, and the hash function may be selected by an SVM. The respective optimal values may share none, some, or all available inputs such as content statistic estimates such as 130. For example, the linear regressor and the SVM may accept same content statistic estimate 130 as input, but the SVM may need additional inputs that include estimates of other content statistics of a same or different table column of a same or different database table.

Depending on the scenario, same sampled table row 2 may contribute value(s) from same or different columns to estimates of different content statistics during a same sampling iteration. For example, a same sampled value from the example column may affect an estimated cardinality, an estimated maximum, and an estimated arithmetic mean. In another example, different columns of same sampled table row 2 contribute respective values for estimation of different content statistics such as respective variances.

Because dynamic convergence during sampling iteration depends on content of database tables and semantics of statistics, convergence may occur in different respective iterations of a same sampling phase for different content statistics. For example, the cardinality estimation of the example column converges in iteration C, but estimation of a minimum or mode of same example column may need additional iterations. Likewise, a same cardinality estimation function may converge at different iterations for different respective columns of a same database table. For example, variance estimation of two columns of a same integer datatype in a same database table may converge at different iterations even though both estimations have the same table rows available from which to sample.

ML model 140 should be trained in a laboratory before deployment into a production environment. In an embodiment, ML model 140 is trained with a corpus that includes: real database content such as from production such as when training entails sampling and/or, in the case of supervised learning, actual content statistics that obviate a need for database content in training such as when training avoids sampling.

In an embodiment, supervised training of ML model 140 includes a validation and/or testing phase that entails: a) invoking ML model 140 based on estimated content statistics based on sampling actual content to predict a first optimal value 150, and b) invoking ML model 140 based on actual statistics of same actual content to predict a second optimal value 150 for same configuration setting 160. During validation or testing, the first and second optimal values 150 may be compared to score or otherwise assess the fitness/readiness of ML model 140.

As explained above, ML model 140 participates in step 204 of the tuning phase and need be invoked only once such that optimal value 150 is calculated only once. An embodiment may also incorporate ML model 140 into step 203 that detects when to cease the sampling phase. As explained above, dynamic convergence detection by step 203 may monitor the relative or absolute magnitude of changes to an estimated content statistic such as estimated cardinality.

An embodiment may additionally or instead invoke ML model 140 also in step 203 in each sampling iteration to monitor the relative or absolute magnitude of changes to a repeatedly calculated optimal value 150. For example, convergence may occur when optimal value 150 changes by less than a relative or absolute threshold amount. Thus, ML model 140 may participate in a feedback control loop that detects when to cease iterative sampling.

3.0 Exemplary Embodiment

Figure 3:
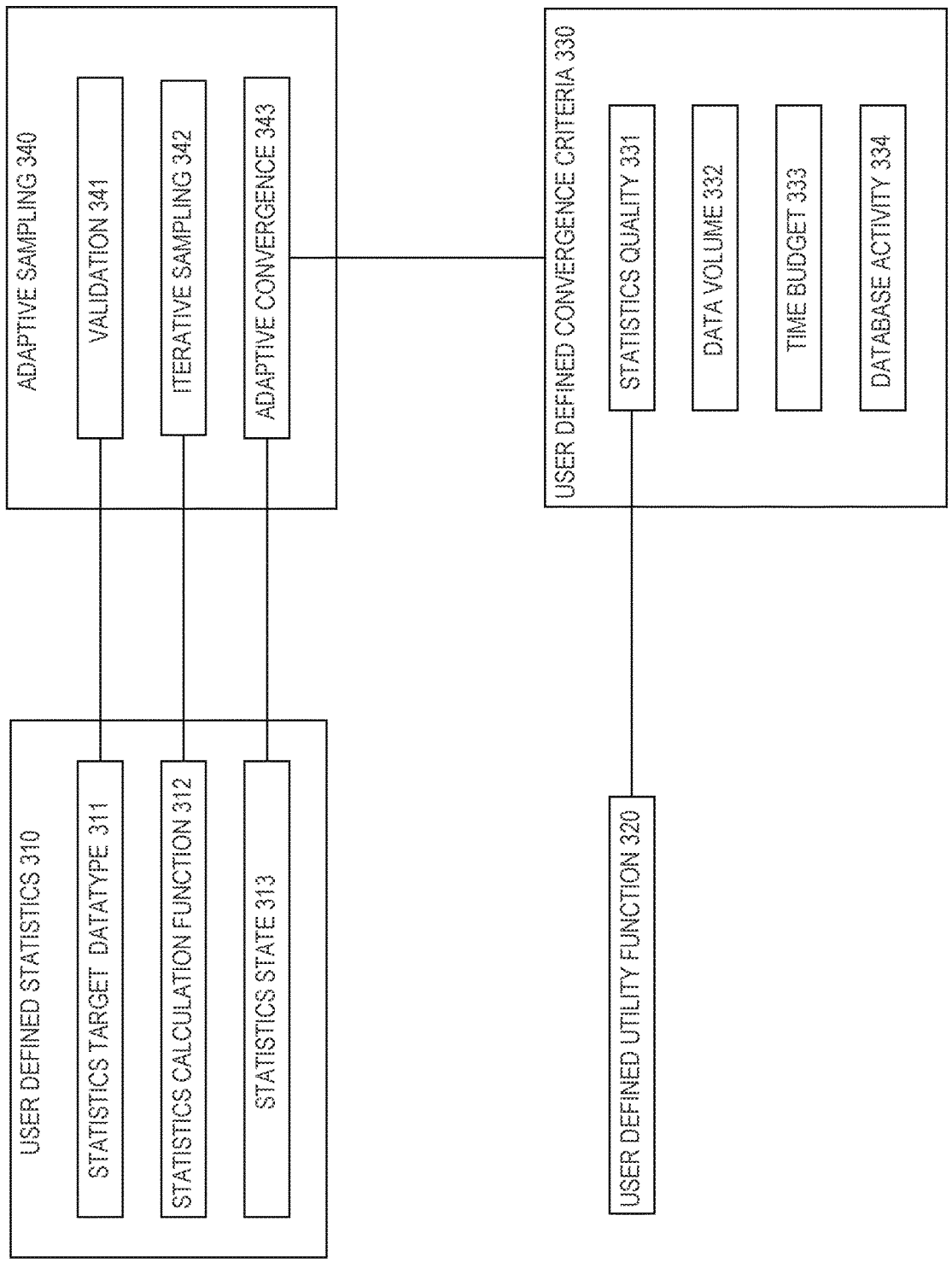
FIG. 3 is a block diagram that depicts exemplary embodiment that demonstrates additional design choices that may be combined.

FIG. 3 is a block diagram that depicts the following exemplary embodiment that demonstrates additional design choices that may be combined with embodiments presented earlier herein. These additional design choices are not requirements of the embodiments presented earlier herein.

During experimental research, the exemplary embodiment sampled a database table of 100 gigabytes total size (400 million rows). For three columns of the database table, the average column string length statistic was adaptively estimated. The statistics converged with just 0.01% sample size, which provided a speedup of: 10× compared to a fixed sample size of 0.1%, and 900× speedup compared to a table scan of all available rows.

The exemplary embodiment may be implemented with user-defined components for use within a central statistics collection loop that includes ML model inference. These user-defined components I-IV are:
  I. The type of the statistics being collected;
  II. Utility function 320 that defines a feedback loop between the statistics collected and the inference result;
  III. Convergence criteria function 330 that determines how early to terminate the collection process; and
  IV. Adaptive sampling 340 provides the central loop that connects above components I-III together.

Details of each of user-defined components I-IV are as follows:
  I. User Defined Statistics 310: Various kinds of data statistics needed defines the feature input for ML model inference. For example, a particular feature can be a count of values in a text column whose string lengths exceed 100 characters. Providing a user-defined statistics 310 interface facilitates straightforward customization by the user. The interface for user-defined statistics 310 includes: statistics value calculation function 312, statistics state 313, and statistics target datatype 311 as discussed later herein.
  II. User Defined Utility Function 320: User defined utility function 320 establishes a feedback loop between the ML model inference (statistic consumer) and the collection process (statistic producer). This facilitates measuring the quality of statistics in terms of user-defined quality criteria 331, as discussed later herein, and not in terms of the accuracy of individual statistics collected. User defined utility function 320 returns a single score that is used to determine the terminating condition for statistic collection. ML model inference may require collection of multiple statistics that are subsequently used as features, either directly or with additional conversion. However, not all features are equally significant to the inference process. User defined utility function 320 may be an important mechanism to determine sufficient quality criteria 331 of the collected statistics. For example, in a straightforward linear regression model use case, user defined utility function 320 can be the ML model inference value itself, where the ML model output can be used to determine the utility of the collected statistics (input features). For more complex models, a weighted average of a feature rank can be used to implement such a function.
  III. User Defined Convergence Criteria 330: One of the central ideas in the exemplary embodiment is to determine when to terminate the statistics collection process. Early termination reduces the overall latency of ML model inference and increases efficiency. The score produced by user defined utility function 320 is used to determine the termination given some user-defined convergence criterion 330 (termination policies). There can be several convergence criteria that work together as discussed later herein.
  IV. Adaptive Sampling 340: Components I-III defined above are tied together using a central loop that adaptively increases the amount of data accessed for computing the statistics. Eventually, the loop terminates based on user defined utility function 320 score and convergence criteria 330. Major responsibilities for this loop are presented later herein.

3.1 Exemplary Interface for User-Defined Statistics Type

The interface for user-defined statistics 310 includes statistic elements Q-S as follows:
  Q. Statistics target datatype 311: This mapping enables the user to limit the statistic collection for a particular datatype. For example, the user might want to calculate an average string length statistic only for string type columns because, widths of fixed-width columns statistics can already be obtained using table metadata such as a relational schema.
  R. Statistics calculation function 312: The user-defined function that implements the algorithm for computing the statistics. This can be a straightforward increment of a counter for statistics related to cardinality, or it can be a complex algorithm such as Hyperloglog to calculate the number of distinct values (NDV).
  S. Statistics state 313: In-memory statistics state 313 is required by the statistics calculation algorithm. For calculating averages, this can be an integer storing the running count and sum values to compute the averages. For Hyperloglog++, with increased accuracy and decreased memory usage compared to Hyperloglog, this can be the compressed sketch representation to keep track of the number of distinct values.

3.2 Exemplary Dynamic Convergence Criteria

Various combinations of dynamic convergence criteria 330 such as T-W may work together as follows:
  T. Statistics quality 331: With this policy the collection process is terminated if the score provided by user defined utility function 320 does not change substantially, i.e., more than a user provided threshold.
  U. Data volume 332: The number of maximum rows accessed during collection can be bounded as a fail-safe mechanism. In case user defined utility function 320 does not converge, this policy will protect against scanning the entire table.
  V. Time Budget 333: Additionally, the collection process can be bounded by a time duration, so that statistics can be finished within a reasonable time. This can be especially useful if a table is unavailable (due to locks) that can delay or block the collection process.
  W. Database activity 334: The statistics collection used for ML model inference should be performed on a production system, which is risky because production demand volatility can jeopardize reliability, availability, and serviceability (RAS) such as during a demand spike. For example, statistics collection may further stress the system at a worst possible time. Instead, the collection can be briefly deferred until low database activity, or the statistics collection process can prematurely terminate during an unexpected demand spike.

3.3 Exemplary Central Loop for Adaptive Sampling

Major responsibilities X-Z of the central loop for adaptive sampling 340 are as follows:

- X. Validation 341: The central loop performs all metadata checks to ensure that the user has access to the data and the datatypes are supported for the collection using the statistics target type mapping defined earlier herein. The loop performs error handling and skips over any data source in case of unsupported types or data unavailability due to locks, access rights, or corruption.
- Y. Iterative sampling 342: The approach uses a sample iterator provided by the database storage engine to get access to uniform random samples. Iterative sampling 342 can be performed at row granularity or a collection of rows (e.g., 512 rows or one database block containing a fixed or varied amount of rows). A sample iterator provides access to new data to increase the total sample size with every step. The approach ensures that all statistics for all columns are computed, while accessing the new sample. For each new sample, the statistic calculation function is used and statistic state 313 is updated based on the data sampled so far.
- Z. Adaptive convergence 343: Once the samples are processed, the output from user defined utility function 320 is computed and convergence criteria 330 are tested to determine the end of the collection process. This ensures that the collection process terminates early with reasonable quality.

3.4 Exemplary ML Model Lifecycle

As ML models evolve over time, they may need to be retrained and redeployed on the production system. This may require changes to the set of input features based on data statistics. The exemplary embodiment is based on user defined interfaces, which are easy to update. The interfaces are implemented as database UDF objects and thus updates are isolated from the internal database engine codebase.

After the user defined interfaces are updated, the only task remaining is configuration parameter tuning for the algorithm of adaptive sampling 340. This may include configuration parameters such as the convergence criteria delta threshold, the max rows limit, and the sample increment size in each iteration. While the configuration parameter can be hand-tuned easily, experimentation relied on an automated process that involves the trained ML model itself such as discussed with embodiments presented earlier herein. These configuration parameters are not the same as configuration setting 160 of FIG. 1.

The user can use the true statistics during offline ML model training. Once the ML model is trained, the configuration parameters are discovered by calculating the deviation between ML model inferences using the true statistics versus ML model inferences using the technique of adaptive sampling 340. As a function of the configuration parameters, gradient descent may be used to minimize the deviation such as during backpropagation as discussed later herein.

4.0 Database Overview

Embodiments of the present invention are used in the context of database management systems (DBMSs). Therefore, a description of an example DBMS is provided.

Generally, a server, such as a database server, is a combination of integrated software components and an allocation of computational resources, such as memory, a node, and processes on the node for executing the integrated software components, where the combination of the software and computational resources are dedicated to providing a particular type of function on behalf of clients of the server.

A database server governs and facilitates access to a particular database, processing requests by clients to access the database.

Users interact with a database server of a DBMS by submitting to the database server commands that cause the database server to perform operations on data stored in a database. A user may be one or more applications running on a client computer that interact with a database server. Multiple users may also be referred to herein collectively as a user.

A database comprises data and a database dictionary that is stored on a persistent memory mechanism, such as a set of hard disks. A database is defined by its own separate database dictionary. A database dictionary comprises metadata that defines database objects contained in a database. In effect, a database dictionary defines much of a database. Database objects include tables, table columns, and tablespaces. A tablespace is a set of one or more files that are used to store the data for various types of database objects, such as a table. If data for a database object is stored in a tablespace, a database dictionary maps a database object to one or more tablespaces that hold the data for the database object.

A database dictionary is referred to by a DBMS to determine how to execute database commands submitted to a DBMS. Database commands can access the database objects that are defined by the dictionary.

A database command may be in the form of a database statement. For the database server to process the database statements, the database statements must conform to a database language supported by the database server. One non-limiting example of a database language that is supported by many database servers is SQL, including proprietary forms of SQL supported by such database servers as Oracle, such as Oracle Database 11g. SQL data definition language ("DDL") instructions are issued to a database server to create or configure database objects, such as tables, views, or complex types. Data manipulation language ("DML") instructions are issued to a DBMS to manage data stored within a database structure. For instance, SELECT, INSERT, UPDATE, and DELETE are common examples of DML instructions found in some SQL implementations. SQL/WL is a common extension of SQL used when manipulating XML data in an object-relational database.

A multi-node database management system is made up of interconnected nodes that share access to the same database. Typically, the nodes are interconnected via a network and share access, in varying degrees, to shared storage, such as with shared access to a set of disk drives and data blocks stored thereon. The nodes in a multi-node database system may be in the form of a group of computers, such as work stations and/or personal computers, that are interconnected via a network. Alternately, the nodes may be the nodes of a grid, which is composed of nodes in the form of server blades interconnected with other server blades on a rack.

Each node in a multi-node database system hosts a database server. A server, such as a database server, is a combination of integrated software components and an allocation of computational resources, such as memory, a node, and processes on the node for executing the integrated software components on a processor, the combination of the software and computational resources being dedicated to performing a particular function on behalf of one or more clients.

Resources from multiple nodes in a multi-node database system can be allocated to running a particular database server's software. Each combination of the software and allocation of resources from a node is a server that is referred to herein as a "server instance" or "instance". A database server may comprise multiple database instances, some or all of which are running on separate computers, including separate server blades.

4.1 Query Processing

A query is an expression, command, or set of commands that, when executed, causes a server to perform one or more operations on a set of data. A query may specify source data object(s), such as table(s), column(s), view(s), or snapshot(s), from which result set(s) are to be determined. For example, the source data object(s) may appear in a FROM clause of a Structured Query Language ("SQL") query. SQL is a well-known example language for querying database objects. As used herein, the term "query" is used to refer to any form of representing a query, including a query in the form of a database statement and any data structure used for internal query representation. The term "table" refers to any source object that is referenced or defined by a query and that represents a set of rows, such as a database table, view, or an inline query block, such as an inline view or subquery.

The query may perform operations on data from the source data object(s) on a row by-row basis as the object(s) are loaded or on the entire source data object(s) after the object(s) have been loaded. A result set generated by some operation(s) may be made available to other operation(s), and, in this manner, the result set may be filtered out or narrowed based on some criteria, and/or joined or combined with other result set(s) and/or other source data object(s).

A subquery is a portion or component of a query that is distinct from other portion(s) or component(s) of the query and that may be evaluated separately (i.e., as a separate query) from the other portion(s) or component(s) of the query. The other portion(s) or component(s) of the query may form an outer query, which may or may not include other subqueries. A subquery nested in the outer query may be separately evaluated one or more times while a result is computed for the outer query.

Generally, a query parser receives a query statement and generates an internal query representation of the query statement. Typically, the internal query representation is a set of interlinked data structures that represent various components and structures of a query statement.

The internal query representation may be in the form of a graph of nodes, each interlinked data structure corresponding to a node and to a component of the represented query statement. The internal representation is typically generated in memory for evaluation, manipulation, and transformation.

Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

Figure 4:
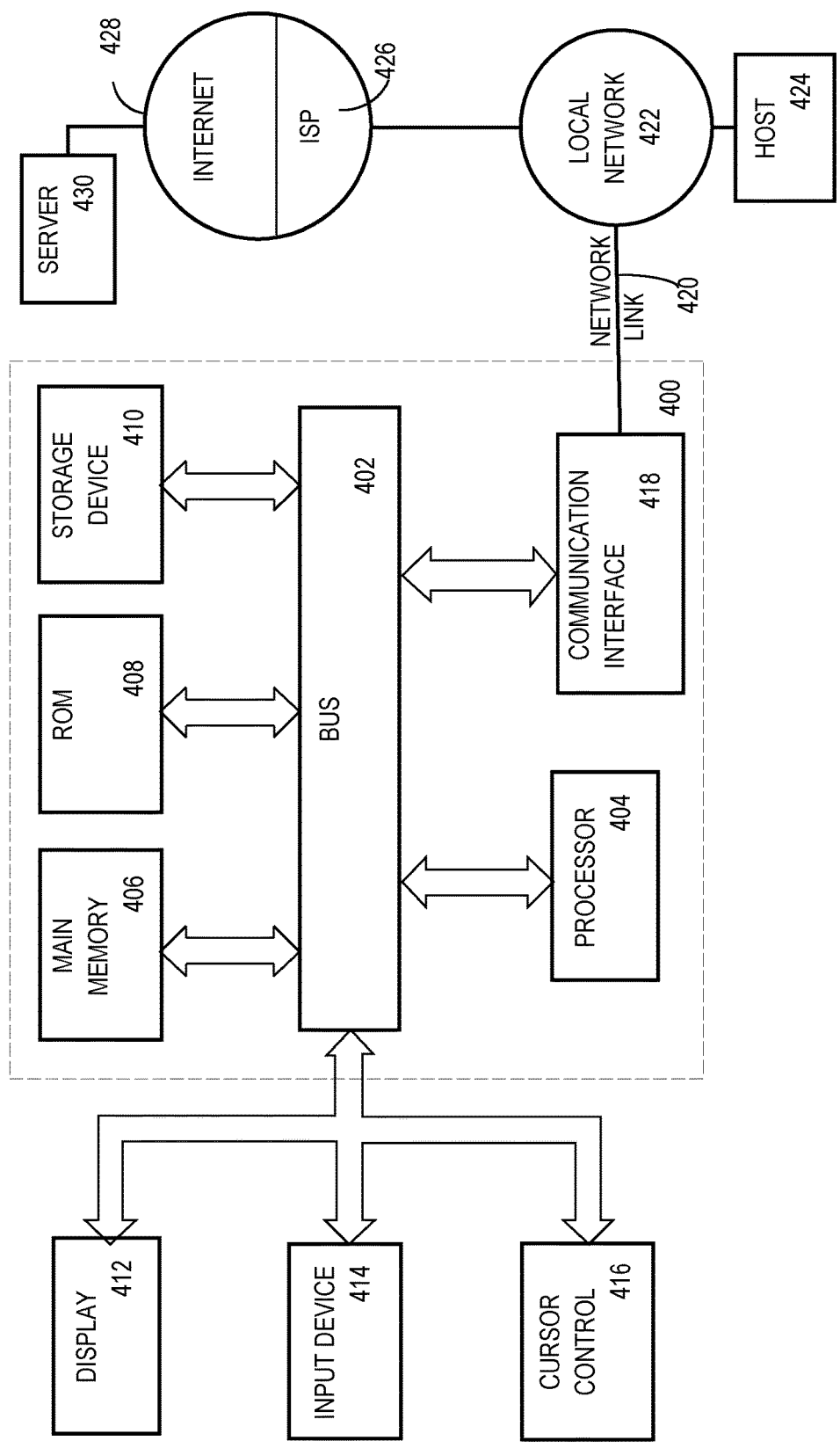
FIG. 4 is a block diagram that illustrates a computer system upon which an embodiment of the invention may be implemented.

For example, FIG. 4 is a block diagram that illustrates a computer system 400 upon which an embodiment of the invention may be implemented. Computer system 400 includes a bus 402 or other communication mechanism for communicating information, and a hardware processor 404 coupled with bus 402 for processing information. Hardware processor 404 may be, for example, a general purpose microprocessor.

Computer system 400 also includes a main memory 406, such as a random access memory (RAM) or other dynamic storage device, coupled to bus 402 for storing information and instructions to be executed by processor 404. Main memory 406 also may be used for storing temporary variables or other intermediate information during execution of instructions to be executed by processor 404. Such instructions, when stored in non-transitory storage media accessible to processor 404, render computer system 400 into a special-purpose machine that is customized to perform the operations specified in the instructions.

Computer system 400 further includes a read only memory (ROM) 408 or other static storage device coupled to bus 402 for storing static information and instructions for processor 404. A storage device 410, such as a magnetic disk, optical disk, or solid-state drive is provided and coupled to bus 402 for storing information and instructions.

Computer system 400 may be coupled via bus 402 to a display 412, such as a cathode ray tube (CRT), for displaying information to a computer user. An input device 414, including alphanumeric and other keys, is coupled to bus 402 for communicating information and command selections to processor 404. Another type of user input device is cursor control 416, such as a mouse, a trackball, or cursor direction keys for communicating direction information and command selections to processor 404 and for controlling cursor movement on display 412. This input device typically has two degrees of freedom in two axes, a first axis (e.g., x) and a second axis (e.g., y), that facilitates the device to specify positions in a plane.

Computer system 400 may implement the techniques described herein using customized hard-wired logic, one or more ASICs or FPGAs, firmware and/or program logic which in combination with the computer system causes or programs computer system 400 to be a special-purpose machine. According to one embodiment, the techniques herein are performed by computer system 400 in response to processor 404 executing one or more sequences of one or more instructions contained in main memory 406. Such instructions may be read into main memory 406 from another storage medium, such as storage device 410. Execution of the sequences of instructions contained in main memory 406 causes processor 404 to perform the process steps described herein. In alternative embodiments, hard-wired circuitry may be used in place of or in combination with software instructions.

The term "storage media" as used herein refers to any non-transitory media that store data and/or instructions that cause a machine to operate in a specific fashion. Such storage media may comprise non-volatile media and/or volatile media. Non-volatile media includes, for example, optical disks, magnetic disks, or solid-state drives, such as storage device 410. Volatile media includes dynamic memory, such as main memory 406. Common forms of storage media include, for example, a floppy disk, a flexible disk, hard disk, solid-state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 402. Transmission media can also take the form of acoustic or light waves, such as those generated during radio-wave and infra-red data communications.

Various forms of media may be involved in carrying one or more sequences of one or more instructions to processor 404 for execution. For example, the instructions may initially be carried on a magnetic disk or solid-state drive of a remote computer. The remote computer can load the instructions into its dynamic memory and send the instructions over a telephone line using a modem. A modem local to computer system 400 can receive the data on the telephone line and use an infra-red transmitter to convert the data to an infra-red signal. An infra-red detector can receive the data carried in the infra-red signal and appropriate circuitry can place the data on bus 402. Bus 402 carries the data to main memory 406, from which processor 404 retrieves and executes the instructions. The instructions received by main memory 406 may optionally be stored on storage device 410 either before or after execution by processor 404.

Computer system 400 also includes a communication interface 418 coupled to bus 402. Communication interface 418 provides a two-way data communication coupling to a network link 420 that is connected to a local network 422. For example, communication interface 418 may be an integrated services digital network (ISDN) card, cable modem, satellite modem, or a modem to provide a data communication connection to a corresponding type of telephone line. As another example, communication interface 418 may be a local area network (LAN) card to provide a data communication connection to a compatible LAN. Wireless links may also be implemented. In any such implementation, communication interface 418 sends and receives electrical, electromagnetic or optical signals that carry digital data streams representing various types of information.

Network link 420 typically provides data communication through one or more networks to other data devices. For example, network link 420 may provide a connection through local network 422 to a host computer 424 or to data equipment operated by an Internet Service Provider (ISP) 426. ISP 426 in turn provides data communication services through the world wide packet data communication network now commonly referred to as the "Internet" 428. Local network 422 and Internet 428 both use electrical, electromagnetic or optical signals that carry digital data streams. The signals through the various networks and the signals on network link 420 and through communication interface 418, which carry the digital data to and from computer system 400, are example forms of transmission media.

Computer system 400 can send messages and receive data, including program code, through the network(s), network link 420 and communication interface 418. In the Internet example, a server 430 might transmit a requested code for an application program through Internet 428, ISP 426, local network 422 and communication interface 418.

The received code may be executed by processor 404 as it is received, and/or stored in storage device 410, or other non-volatile storage for later execution.

Software Overview

Figure 5:
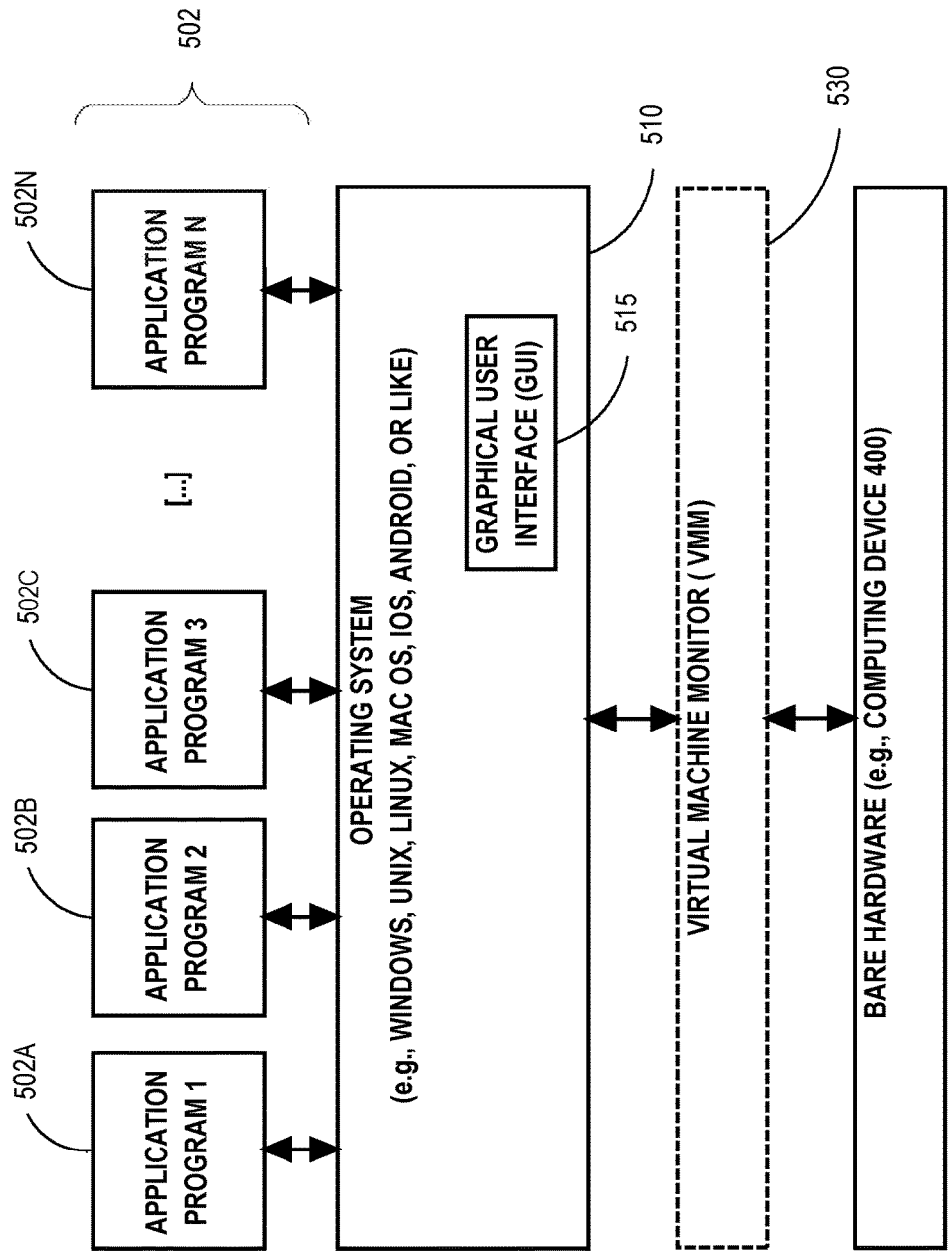
FIG. 5 is a block diagram that illustrates a basic software system that may be employed for controlling the operation of a computing system.

FIG. 5 is a block diagram of a basic software system 500 that may be employed for controlling the operation of computing system 400. Software system 500 and its components, including their connections, relationships, and functions, are meant to be exemplary only, and not meant to limit implementations of the example embodiment(s). Other software systems suitable for implementing the example embodiment(s) may have different components, including components with different connections, relationships, and functions.

Software system 500 is provided for directing the operation of computing system 400. Software system 500, which may be stored in system memory (RAM) 406 and on fixed storage (e.g., hard disk or flash memory) 410, includes a kernel or operating system (OS) 510.

The OS 510 manages low-level aspects of computer operation, including managing execution of processes, memory allocation, file input and output (I/O), and device I/O. One or more application programs, represented as 502A, 502B, 502C . . . 502N, may be "loaded" (e.g., transferred from fixed storage 410 into memory 406) for execution by the system 500. The applications or other software intended for use on computer system 400 may also be stored as a set of downloadable computer-executable instructions, for example, for downloading and installation from an Internet location (e.g., a Web server, an app store, or other online service).

Software system 500 includes a graphical user interface (GUI) 515, for receiving user commands and data in a graphical (e.g., "point-and-click" or "touch gesture") fashion. These inputs, in turn, may be acted upon by the system 500 in accordance with instructions from operating system 510 and/or application(s) 502. The GUI 515 also serves to display the results of operation from the OS 510 and application(s) 502, whereupon the user may supply additional inputs or terminate the session (e.g., log off).

OS 510 can execute directly on the bare hardware 520 (e.g., processor(s) 404) of computer system 400. Alternatively, a hypervisor or virtual machine monitor (VMM) 530 may be interposed between the bare hardware 520 and the OS 510. In this configuration, VMM 530 acts as a software "cushion" or virtualization layer between the OS 510 and the bare hardware 520 of the computer system 400.

VMM 530 instantiates and runs one or more virtual machine instances ("guest machines"). Each guest machine comprises a "guest" operating system, such as OS 510, and one or more applications, such as application(s) 502, designed to execute on the guest operating system. The VMM 530 presents the guest operating systems with a virtual operating platform and manages the execution of the guest operating systems.

In some instances, the VMM 530 may facilitate a guest operating system to run as if it is running on the bare hardware 520 of computer system 400 directly. In these instances, the same version of the guest operating system configured to execute on the bare hardware 520 directly may also execute on VMM 530 without modification or reconfiguration. In other words, VMM 530 may provide full hardware and CPU virtualization to a guest operating system in some instances.

In other instances, a guest operating system may be specially designed or configured to execute on VMM 530 for efficiency. In these instances, the guest operating system is "aware" that it executes on a virtual machine monitor. In other words, VMM 530 may provide para-virtualization to a guest operating system in some instances.

A computer system process comprises an allotment of hardware processor time, and an allotment of memory (physical and/or virtual), the allotment of memory being for storing instructions executed by the hardware processor, for storing data generated by the hardware processor executing the instructions, and/or for storing the hardware processor state (e.g. content of registers) between allotments of the hardware processor time when the computer system process is not running. Computer system processes run under the control of an operating system, and may run under the control of other programs being executed on the computer system.

Cloud Computing

The term "cloud computing" is generally used herein to describe a computing model which enables on-demand access to a shared pool of computing resources, such as computer networks, servers, software applications, and services, and which facilitates for rapid provisioning and release of resources with minimal management effort or service provider interaction.

A cloud computing environment (sometimes referred to as a cloud environment, or a cloud) can be implemented in a variety of different ways to best suit different requirements. For example, in a public cloud environment, the underlying computing infrastructure is owned by an organization that makes its cloud services available to other organizations or to the general public. In contrast, a private cloud environment is generally intended solely for use by, or within, a single organization. A community cloud is intended to be shared by several organizations within a community; while a hybrid cloud comprise two or more types of cloud (e.g., private, community, or public) that are bound together by data and application portability.

Generally, a cloud computing model enables some of those responsibilities which previously may have been provided by an organization's own information technology department, to instead be delivered as service layers within a cloud environment, for use by consumers (either within or external to the organization, according to the cloud's public/private nature). Depending on the particular implementation, the precise definition of components or features provided by or within each cloud service layer can vary, but common examples include: Software as a Service (SaaS), in which consumers use software applications that are running upon a cloud infrastructure, while a SaaS provider manages or controls the underlying cloud infrastructure and applications. Platform as a Service (PaaS), in which consumers can use software programming languages and development tools supported by a PaaS provider to develop, deploy, and otherwise control their own applications, while the PaaS provider manages or controls other aspects of the cloud environment (i.e., everything below the run-time execution environment). Infrastructure as a Service (IaaS), in which consumers can deploy and run arbitrary software applications, and/or provision processing, storage, networks, and other fundamental computing resources, while an IaaS provider manages or controls the underlying physical cloud infrastructure (i.e., everything below the operating system layer). Database as a Service (DBaaS) in which consumers use a database server or Database Management System that is running upon a cloud infrastructure, while a DbaaS provider manages or controls the underlying cloud infrastructure and applications.

The above-described basic computer hardware and software and cloud computing environment presented for purpose of illustrating the basic underlying computer components that may be employed for implementing the example embodiment(s). The example embodiment(s), however, are not necessarily limited to any particular computing environment or computing device configuration. Instead, the example embodiment(s) may be implemented in any type of system architecture or processing environment that one skilled in the art, in light of this disclosure, would understand as capable of supporting the features and functions of the example embodiment(s) presented herein.

Machine Learning Models

A machine learning model is trained using a particular machine learning algorithm. Once trained, input is applied to the machine learning model to make a prediction, which may also be referred to herein as a predicated output or output. Attributes of the input may be referred to as features and the values of the features may be referred to herein as feature values.

A machine learning model includes a model data representation or model artifact. A model artifact comprises parameters values, which may be referred to herein as theta values, and which are applied by a machine learning algorithm to the input to generate a predicted output. Training a machine learning model entails determining the theta values of the model artifact. The structure and organization of the theta values depends on the machine learning algorithm.

In supervised training, training data is used by a supervised training algorithm to train a machine learning model. The training data includes input and a "known" output. In an embodiment, the supervised training algorithm is an iterative procedure. In each iteration, the machine learning algorithm applies the model artifact and the input to generate a predicted output. An error or variance between the predicted output and the known output is calculated using an objective function. In effect, the output of the objective function indicates the accuracy of the machine learning model based on the particular state of the model artifact in the iteration. By applying an optimization algorithm based on the objective function, the theta values of the model artifact are adjusted. An example of an optimization algorithm is gradient descent. The iterations may be repeated until a desired accuracy is achieved or some other criteria is met.

In a software implementation, when a machine learning model is referred to as receiving an input, executed, and/or as generating an output or predication, a computer system process executing a machine learning algorithm applies the model artifact against the input to generate a predicted output. A computer system process executes a machine learning algorithm by executing software configured to cause execution of the algorithm.

Classes of problems that machine learning (ML) excels at include clustering, classification, regression, anomaly detection, prediction, and dimensionality reduction (i.e. simplification). Examples of machine learning algorithms include decision trees, support vector machines (SVM), Bayesian networks, stochastic algorithms such as genetic algorithms (GA), and connectionist topologies such as artificial neural networks (ANN). Implementations of machine learning may rely on matrices, symbolic models, and hierarchical and/or associative data structures. Parameterized (i.e. configurable) implementations of best of breed machine learning algorithms may be found in open source libraries such as Google's TensorFlow for Python and C++ or Georgia Institute of Technology's MLPack for C++. Shogun is an open source C++ ML library with adapters for several programing languages including C #, Ruby, Lua, Java, MatLab, R, and Python.

Artificial Neural Networks

An artificial neural network (ANN) is a machine learning model that at a high level models a system of neurons interconnected by directed edges. An overview of neural networks is described within the context of a layered feedforward neural network. Other types of neural networks share characteristics of neural networks described below.

In a layered feed forward network, such as a multilayer perceptron (MLP), each layer comprises a group of neurons. A layered neural network comprises an input layer, an output layer, and one or more intermediate layers referred to hidden layers.

Neurons in the input layer and output layer are referred to as input neurons and output neurons, respectively. A neuron in a hidden layer or output layer may be referred to herein as an activation neuron. An activation neuron is associated with an activation function. The input layer does not contain any activation neuron.

From each neuron in the input layer and a hidden layer, there may be one or more directed edges to an activation neuron in the subsequent hidden layer or output layer. Each edge is associated with a weight. An edge from a neuron to an activation neuron represents input from the neuron to the activation neuron, as adjusted by the weight.

For a given input to a neural network, each neuron in the neural network has an activation value. For an input neuron, the activation value is simply an input value for the input. For an activation neuron, the activation value is the output of the respective activation function of the activation neuron.

Each edge from a particular neuron to an activation neuron represents that the activation value of the particular neuron is an input to the activation neuron, that is, an input to the activation function of the activation neuron, as adjusted by the weight of the edge. Thus, an activation neuron in the subsequent layer represents that the particular neuron's activation value is an input to the activation neuron's activation function, as adjusted by the weight of the edge. An activation neuron can have multiple edges directed to the activation neuron, each edge representing that the activation value from the originating neuron, as adjusted by the weight of the edge, is an input to the activation function of the activation neuron.

Each activation neuron is associated with a bias. To generate the activation value of an activation neuron, the activation function of the neuron is applied to the weighted activation values and the bias.

Illustrative Data Structures for Neural Network

The artifact of a neural network may comprise matrices of weights and biases.

Training a neural network may iteratively adjust the matrices of weights and biases.

For a layered feedforward network, as well as other types of neural networks, the artifact may comprise one or more matrices of edges W. A matrix W represents edges from a layer L-1 to a layer L. Given the number of neurons in layer L-1 and L is N[L-1] and N[L], respectively, the dimensions of matrix W is N[L-1] columns and N[L] rows.

Biases for a particular layer L may also be stored in matrix B having one column with N[L] rows.

The matrices W and B may be stored as a vector or an array in RAM memory, or comma separated set of values in memory. When an artifact is persisted in persistent storage, the matrices W and B may be stored as comma separated values, in compressed and/serialized form, or other suitable persistent form.

A particular input applied to a neural network comprises a value for each input neuron. The particular input may be stored as vector. Training data comprises multiple inputs, each being referred to as sample in a set of samples. Each sample includes a value for each input neuron. A sample may be stored as a vector of input values, while multiple samples may be stored as a matrix, each row in the matrix being a sample.

When an input is applied to a neural network, activation values are generated for the hidden layers and output layer. For each layer, the activation values may be stored in one column of a matrix A having a row for every neuron in the layer. In a vectorized approach for training, activation values may be stored in a matrix, having a column for every sample in the training data.

Training a neural network requires storing and processing additional matrices. Optimization algorithms generate matrices of derivative values which are used to adjust matrices of weights W and biases B. Generating derivative values may use and require storing matrices of intermediate values generated when computing activation values for each layer.

The number of neurons and/or edges determines the size of matrices needed to implement a neural network. The smaller the number of neurons and edges in a neural network, the smaller matrices and amount of memory needed to store matrices. In addition, a smaller number of neurons and edges reduces the amount of computation needed to apply or train a neural network. Less neurons means less activation values need be computed, and/or less derivative values need be computed during training.

Properties of matrices used to implement a neural network correspond to neurons and edges. A cell in a matrix W represents a particular edge from a neuron in layer L-1 to L. An activation neuron represents an activation function for the layer that includes the activation function. An activation neuron in layer L corresponds to a row of weights in a matrix W for the edges between layer L and L-1 and a column of weights in matrix W for edges between layer L and L+1. During execution of a neural network, a neuron also corresponds to one or more activation values stored in matrix A for the layer and generated by an activation function.

An ANN is amenable to vectorization for data parallelism, which may exploit vector hardware such as single instruction multiple data (SIMD), such as with a graphical processing unit (GPU). Matrix partitioning may achieve horizontal scaling such as with symmetric multiprocessing (SMP) such as with a multicore central processing unit (CPU) and or multiple coprocessors such as GPUs. Feed forward computation within an ANN may occur with one step per neural layer. Activation values in one layer are calculated based on weighted propagations of activation values of the previous layer, such that values are calculated for each subsequent layer in sequence, such as with respective iterations of a for loop. Layering imposes sequencing of calculations that is not parallelizable. Thus, network depth (i.e. amount of layers) may cause computational latency. Deep learning entails endowing a multilayer perceptron (MLP) with many layers. Each layer achieves data abstraction, with complicated (i.e. multidimensional as with several inputs) abstractions needing multiple layers that achieve cascaded processing. Reusable matrix based implementations of an ANN and matrix operations for feed forward processing are readily available and parallelizable in neural network libraries such as Google's TensorFlow for Python and C++, OpenNN for C++, and University of Copenhagen's fast artificial neural network (FANN). These libraries also provide model training algorithms such as backpropagation.

Backpropagation

An ANN's output may be more or less correct. For example, an ANN that recognizes letters may mistake an I as an L because those letters have similar features. Correct output may have particular value(s), while actual output may have somewhat different values. The arithmetic or geometric difference between correct and actual outputs may be measured as error according to a loss function, such that zero represents error free (i.e. completely accurate) behavior. For any edge in any layer, the difference between correct and actual outputs is a delta value.

Backpropagation entails distributing the error backward through the layers of the ANN in varying amounts to all of the connection edges within the ANN. Propagation of error causes adjustments to edge weights, which depends on the gradient of the error at each edge. Gradient of an edge is calculated by multiplying the edge's error delta times the activation value of the upstream neuron. When the gradient is negative, the greater the magnitude of error contributed to the network by an edge, the more the edge's weight should be reduced, which is negative reinforcement. When the gradient is positive, then positive reinforcement entails increasing the weight of an edge whose activation reduced the error. An edge weight is adjusted according to a percentage of the edge's gradient. The steeper is the gradient, the bigger is the adjustment. Not all edge weights are adjusted by a same amount. As model training continues with additional input samples, the error of the ANN should decline. Training may cease when the error stabilizes (i.e. ceases to reduce) or vanishes beneath a threshold (i.e. approaches zero). Example mathematical formulae and techniques for feedforward multilayer perceptron (MLP), including matrix operations and backpropagation, are taught in related reference "EXACT CALCULATION OF THE HESSIAN MATRIX FOR THE MULTI-LAYER PERCEPTRON," by Christopher M. Bishop.

Model training may be supervised or unsupervised. For supervised training, the desired (i.e. correct) output is already known for each example in a training set. The training set is configured in advance by (e.g. a human expert) assigning a categorization label to each example. For example, the training set for optical character recognition may have blurry photographs of individual letters, and an expert may label each photo in advance according to which letter is shown. Error calculation and backpropagation occurs as explained above.

Unsupervised model training is more involved because desired outputs need to be discovered during training. Unsupervised training may be easier to adopt because a human expert is not needed to label training examples in advance. Thus, unsupervised training saves human labor. A natural way to achieve unsupervised training is with an autoencoder, which is a kind of ANN. An autoencoder functions as an encoder/decoder (codec) that has two sets of layers. The first set of layers encodes an input example into a condensed code that needs to be learned during model training. The second set of layers decodes the condensed code to regenerate the original input example. Both sets of layers are trained together as one combined ANN. Error is defined as the difference between the original input and the regenerated input as decoded. After sufficient training, the decoder outputs more or less exactly whatever is the original input.

An autoencoder relies on the condensed code as an intermediate format for each input example. It may be counter-intuitive that the intermediate condensed codes do not initially exist and instead emerge only through model training. Unsupervised training may achieve a vocabulary of intermediate encodings based on features and distinctions of unexpected relevance. For example, which examples and which labels are used during supervised training may depend on somewhat unscientific (e.g. anecdotal) or otherwise incomplete understanding of a problem space by a human expert. Whereas, unsupervised training discovers an apt intermediate vocabulary based more or less entirely on statistical tendencies that reliably converge upon optimality with sufficient training due to the internal feedback by regenerated decodings. Autoencoder implementation and integration techniques are taught in related U.S. patent application Ser. No. 14/558,700, entitled "AUTO-ENCODER ENHANCED SELF-DIAGNOSTIC COMPONENTS FOR MODEL MONITORING". That patent application elevates a supervised or unsupervised ANN model as a first class object that is amenable to management techniques such as monitoring and governance during model development such as during training.

Random Forest

A random forest or random decision forest is an ensemble of learning approaches that construct a collection of randomly generated nodes and decision trees during a training phase. Different decision trees of a forest are constructed to be each randomly restricted to only particular subsets of feature dimensions of the data set, such as with feature bootstrap aggregating (bagging). Therefore, the decision trees gain accuracy as the decision trees grow without being forced to over fit training data as would happen if the decision trees were forced to learn all feature dimensions of the data set. A prediction may be calculated based on a mean (or other integration such as soft max) of the predictions from the different decision trees.

Random forest hyper-parameters may include: number-of-trees-in-the-forest, maximum-number-of-features-considered-for-splitting-a-node, number-of-levels-in-each-decision-tree, minimum-number-of-data-points-on-a-leaf-node, method-for-sampling-data-points, etc.

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

What is claimed is:

1. A method comprising:
   in response to initiation of query planning that generates a query plan, repeatedly until a dynamic convergence criterion is satisfied:
      sampling a subset of values in a database table in a database management system (DBMS), and
      adjusting one or more content statistic estimates of the database table based on said subset of values in the database table;
   predicting, by a machine learning (ML) model and based on said one or more content statistic estimates of the database table, an optimal value for a query plan configuration setting; and
   generating the query plan, including assigning the optimal value to the query plan configuration setting in the query plan.

2. The method of claim 1 further comprising satisfying the dynamic convergence criterion based on repeatedly predicting the optimal value for the query plan configuration setting.

3. The method of claim 1 further comprising sampling a subset of values in the database table in response to at least one selected from the group consisting of:
- preparation of a prepared data manipulation language (DML) statement,
- completion of query planning for a previous query,
- a demand spike or idleness of said DBMS,
- a scheduled timer,
- archiving or reporting or extract/translate/load (ETL) for said DBMS,
- availability of disk space or volatile memory,
- table truncation,
- index creation, and
- an occurrence of a database trigger.

4. The method of claim 1 further comprising:
- training the ML model based on exact content statistics;
- comparing first predictions, by the ML model and based on said exact content statistics, to second predictions by the ML model that are based on second content statistic estimates.

5. The method of claim 1 wherein said repeatedly sampling the subset of values in the database table comprises sampling disjoint subsets of rows of the database table.

6. The method of claim 5 wherein said disjoint subsets of rows comprises a first subset of rows and a second subset of rows that have different amounts of rows.

7. The method of claim 1 wherein said adjusting one or more content statistic estimates of the database table comprises a user defined function (UDF) calculating at least one selected from the group consisting of:
- a cumulative count of distinct values in said repeatedly sampling a subset of values in the database table, and
- an estimated cardinality of a column of the database table.

8. The method of claim 1 further comprising satisfying the dynamic convergence criterion based on a UDF that performs at least one selected from the group consisting of convergence detection and calculation of a percent change or absolute change in one of the one or more content statistic estimates of the database table.

9. The method of claim 1 wherein said query plan configuration setting comprises at least one selected from the group consisting of: a hash value width, a hash bin count, and a hash function.

10. The method of claim 1 further comprising satisfying the dynamic convergence criterion based on multiple content statistics.

11. One or more non-transitory computer-readable media storing instructions that, when executed by one or more processors, cause:
- in response to initiation of query planning that generates a query plan, repeatedly until a dynamic convergence criterion is satisfied:
  - sampling a subset of values in a database table in a database management system (DBMS), and
  - adjusting one or more content statistic estimates of the database table based on said subset of values in the database table;
- predicting, by a machine learning (ML) model and based on said one or more content statistic estimates of the database table, an optimal value for a query plan configuration setting; and
- generating the query plan, including assigning the optimal value to the query plan configuration setting in the query plan.

12. The one or more non-transitory computer-readable media of claim 11 wherein the instructions further cause satisfying the dynamic convergence criterion based on repeatedly predicting the optimal value for the query plan configuration setting.

13. The one or more non-transitory computer-readable media of claim 11 further comprising sampling a subset of values in the database table in response to at least one selected from the group consisting of:
- preparation of a prepared data manipulation language (DML) statement,
- completion of query planning for a previous query,
- a demand spike or idleness of said DBMS,
- a scheduled timer,
- archiving or reporting or extract/translate/load (ETL) for said DBMS,
- availability of disk space or volatile memory,
- table truncation,
- index creation, and
- an occurrence of a database trigger.

14. The one or more non-transitory computer-readable media of claim 11 wherein the instructions further cause:
- training the ML model based on exact content statistics;
- comparing first predictions, by the ML model and based on said exact content statistics, to second predictions by the ML model that are based on second content statistic estimates.

15. The one or more non-transitory computer-readable media of claim 11 wherein said repeatedly sampling the subset of values in the database table comprises sampling disjoint subsets of rows of the database table.

16. The one or more non-transitory computer-readable media of claim 15 wherein said disjoint subsets of rows comprises a first subset of rows and a second subset of rows that have different amounts of rows.

17. The one or more non-transitory computer-readable media of claim 11 wherein said adjusting one or more content statistic estimates of the database table comprises a user defined function (UDF) calculating at least one selected from the group consisting of:
- a cumulative count of distinct values in said repeatedly sampling a subset of values in the database table, and
- an estimated cardinality of a column of the database table.

18. The one or more non-transitory computer-readable media of claim 11 wherein the instructions further cause satisfying the dynamic convergence criterion based on a UDF that performs at least one selected from the group consisting of convergence detection and calculation of a percent change or absolute change in one of the one or more content statistic estimates of the database table.

19. The one or more non-transitory computer-readable media of claim 11 wherein said query plan configuration setting comprises at least one selected from the group consisting of: a hash value width, a hash bin count, and a hash function.

20. The one or more non-transitory computer-readable media of claim 11 wherein the instructions further cause satisfying the dynamic convergence criterion based on multiple content statistics.

* * * * *